(12) United States Patent
Kanai

(10) Patent No.: US 6,219,214 B1
(45) Date of Patent: Apr. 17, 2001

(54) SWITCHING CIRCUIT PROTECTION APPARATUS AND METHOD

(75) Inventor: Takeo Kanai, Saitama-ken (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 08/329,687

(22) Filed: Oct. 26, 1994

Related U.S. Application Data

(63) Continuation of application No. 07/899,296, filed on Jun. 16, 1992, now abandoned.

(30) Foreign Application Priority Data

Jun. 26, 1991 (JP) .................................................. 3-153609

(51) Int. Cl.$^7$ ............................... H02H 7/00; H02H 1/04
(52) U.S. Cl. ............................................. 361/18; 361/100
(58) Field of Search .................................. 361/18, 54, 56, 361/57, 100

(56) References Cited

U.S. PATENT DOCUMENTS 4,697,219  *  9/1987  Mitsuoka .............................. 361/93
4,796,146  *  1/1989  Takahashi .............................. 361/91

* cited by examiner

Primary Examiner—Michael J. Sherry
Assistant Examiner—Kim Huynh
(74) Attorney, Agent, or Firm—Foley & Lardner

(57) ABSTRACT

A switching circuit protection technique includes detecting the self-firing of at least one switching element due to an over-voltage in a switching circuit having multiple parallel circuits, applying a firing pulse to all switching elements and the switching circuit in response to the detected self-firing and firing all of the switching elements at the same time in response to a firing pulse.

9 Claims, 4 Drawing Sheets

SWITCHING CIRCUIT PROTECTION APPARATUS AND METHOD

This application is a continuation of application Ser. No. 07/899,296, filed Jun. 16, 1992, now abandoned.

BACKGROUND OF THE INVENTION

1. Field of the Invention

This invention relates to an apparatus for protecting switching circuits having parallel multiple switching elements with the characteristic of self-firing due to an over-voltage and a method of protecting the switching circuits.

2. Description of the Prior Art

Over-voltages are generated in the field windings of generators and motors according to asynchronous inputs, short circuits, and the like. Over-voltage protection circuits, in which switching elements, for example thyristors, are applied to the protection of these devices from over-voltages. FIGS. 3 and 4 show prior art over-voltage protection circuits having thyristors as switching elements.

In FIG. 3, 41 is a generator, 42 is a field winding of generator 41, 43 is a thyristor rectifier which supplies direct current (DC) power to the field winding 42 and 44 is an over-voltage protection circuit in which thyristors 45 are used for protecting from over-voltages generated in the field winding 42.

The thyristors 45 in over-voltage protection circuit 44 are caused to fire by over-voltages generated in the field coil 42 and form a short circuit, thus protecting the generator 41 and the thyristor rectifier 43. In order to improve the reliability of this over-voltage protection circuit, thyristors 45 are used which have the characteristic of self-firing without a gate signal when a certain level of voltage is impressed (hereafter, these thyristors 45 are referred to as VBO free thyristors).

FIG. 4 is a detailed diagram of a prior art over-voltage protection circuit which uses VBO free thyristors. Although a suitable number of VBO free thyristors may be connected in series or parallel according to the voltage and current used in the over-voltage protection circuit, FIG. 4 shows the case of 3 parallels. Elements 10, 20 and 30 are reactors which equalize the current shares between the parallel circuits. Elements 11, 12, 21, 22, 31 and 32 are VBO free thyristors. Element 55 is a gate circuit which supplies gate pulses to VBO free thyristors 11, 12, 21 ,22 ,31 and 32 when an ON command is supplied to the over-voltage protection circuit.

In the circuit in FIG. 4, VBO free thyristors 11, 12, 21, 22, 31 and 32 can be switched ON by detecting faults such as circuit over-voltage or generator short-circuits. However, even when there is no ON command, VBO free thyristors 11, 12, 21, 22, 31 and 32 can fire by themselves and prevent over-voltage.

In the prior art circuit in FIG. 4, when VBO free thyristors 11, 12, 21, 22, 31 and 32 self-fire due to over-voltage, they do not fire simultaneously due to randomness of firing voltage levels between individual thyristors and temperature variations. If it is assumed that the firing level of VBO free thyristor 11 is the lowest, VBO free thyristor 11 will fire first. The voltage impressed on VBO free thyristor 12 will increase due to the firing of VBO free thyristor 11. Therefore, VBO free thyristor 12 will also fire almost simultaneously. In this way, the series circuit which includes VBO free thyristors 11 and 12 will fire.

On the other hand, when the self-firing levels of the series circuits which include VBO free thyristors 21, 22, 31 and 32 are high, over-voltage is inhibited due to the firing of the series circuit which includes VBO free thyristors 11 and 12. Therefore, the series circuits which include VBO free thyristors 21, 22, 31 and 32 will not fire. For this reason, the circuit current concentrates in one of the three parallel circuits, so that three times the current flows through VBO free thyristors 11 and 12, and VBO free thyristors 11 and 12 will break down.

As described above, due to randomness between the self-firing voltages of individual VBO free thyristors and temperature variations, the flow of current becomes concentrated in one of the parallel circuits. In order to prevent this, devices with completely identical characteristics were selected from a suitable number of VBO free thyristors and these were connected in parallel. In addition, temperature control for the unit was required in order to prevent the temperatures from becoming uneven. Thus, there was the problem of the unit becoming bulky and also very costly.

SUMMARY OF THE INVENTION

It is an object of the invention to provide an apparatus for protecting switching circuits and an effective method of protecting the switching circuits which prevents current concentration in one circuit of the switching elements which are connected in parallel as described above.

In order to achieve the above object, an apparatus of this invention is comprised of a switching circuit composed by connecting in parallel multiple circuits in which at least one switching element having the characteristic of self-firing according to an over-voltage are connected in series; detect means for detecting the self-firing of at least one switching element in the switching circuit; fire means for applying an firing pulse to all the switching elements in response to an output signal from the detect means. And a method of this invention entails detecting the self-firing of at least one switching element in the switching circuit and applying a firing pulse to all the switching elements in response to the detected self-firing.

In the invention constructed as above, a firing pulse is supplied to the other'switching elements which are connected with a switching element which has fired according to over-voltage. Therefore, current concentration in one of the parallel connected multiple circuits can be prevented.

DESCRIPTION OF THE PREFERRED EMBODIMENT

The following is a description of an embodiment of this invention with reference to the drawings.

Figure 1:
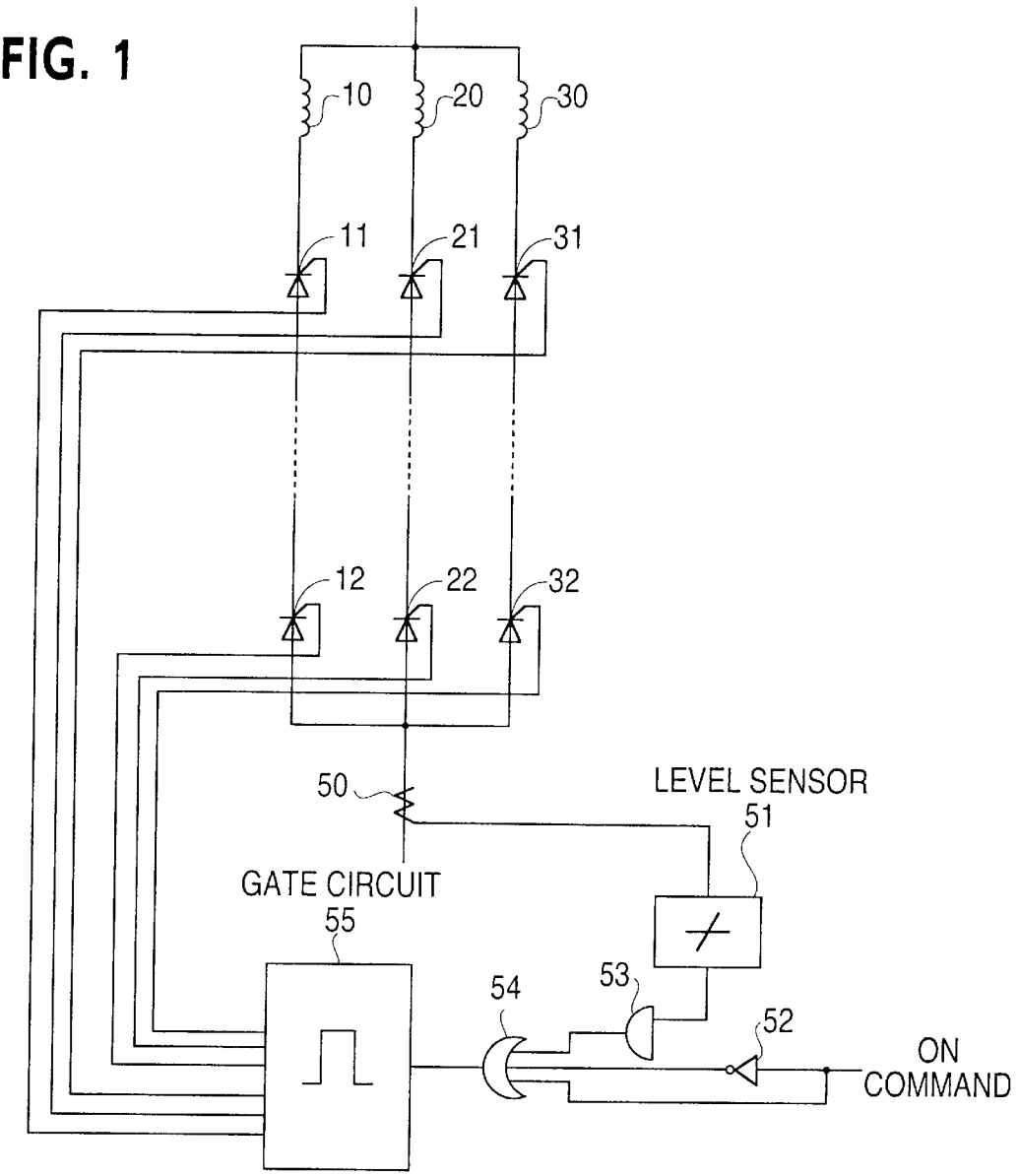
FIG. 1 is a schematic diagram showing a first embodiment of this invention.
Figure 3:
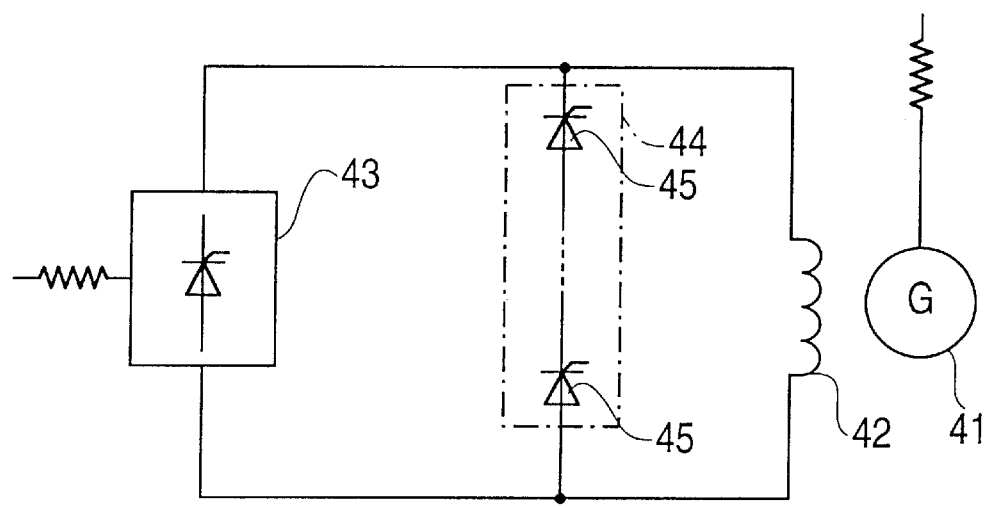
FIG. 3 is a schematic diagram showing a system used for an over-voltage protection circuit.
Figure 4:
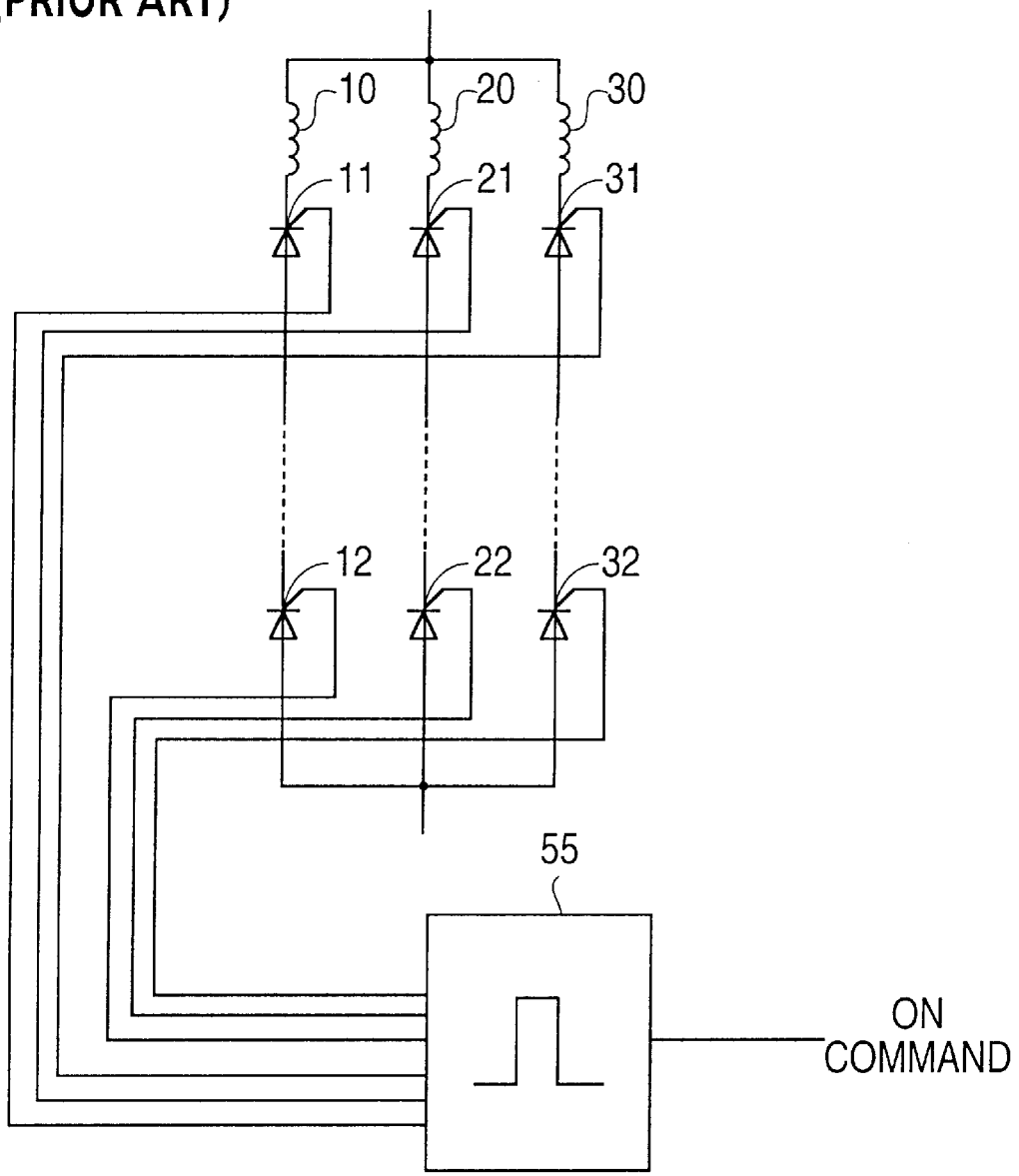
FIG. 4 is a schematic diagram showing a prior art example.

FIG. 1 is a schematic diagram of a first embodiment of this invention, and the same symbols are given to devices which operate with the same functions as in FIGS. 3 and 4. And in this embodiment, VBO free thyristors are used as the switching elements.

In FIG. 1, 50 is a current sensor which detects the current flowing in the VBO free thyristor circuit; 51 is a level sensor which detects whether or not the output signal of current sensor 50 has exceeded a pre-set level; 52 is a NOT circuit which inserts signals; 53 is an AND circuit which takes a logical product and 54 is an OR circuit which takes a logical sum.

In the circuit in FIG. 1, if, for instance, VBO free thyristor 11 is assumed to arc due to over-voltage, the shared voltage of VBO free thyristor 12 will increase due to the firing of VBO free thyristor 11. Thus, VBO free thyristor 12 will also fire almost simultaneously due to over-voltage. In this way, one of the three parallel circuits which includes VBO free thyristors 11 and 12 will fire. For this reason, a current will flow through VBO free thyristors 11 and 12, and this current will be detected by current sensor 50. If this current exceeds a pre-set level, the level sensor will detect this and generate an output. In order to detect that the firing is due to an over-voltage, the logical product with the inserted signal of the ON command is taken, by AND circuit 53. By this means, the fact that some VBO free thyristors have fired and a current is flowing in a state where there is no ON command, that is to say that they have fired due to an over-voltage, can be detected.

The logic sum of the output of AND circuit 53 with the ON command is taken by OR circuit 54, and supplied to gate circuit 55. When a signal is inputted, gate circuit 55 impresses firing pulses on all VBO free thyristors 11, 12, 21, 22, 31 and 32 simultaneously.

In the above way, when VBO free thyristor 11 has fired due to over-voltage, the fact that a current is flowing is detected and firing pulses are also applied to the other VBO free thyristors 21, 22, 31 and 32. Therefore, since VBO free thyristors 21, 22, 31 and 32 also arc, the VBO free thyristors of all three parallels fire. Thus, current concentration in one circuit can be prevented.

Figure 2:
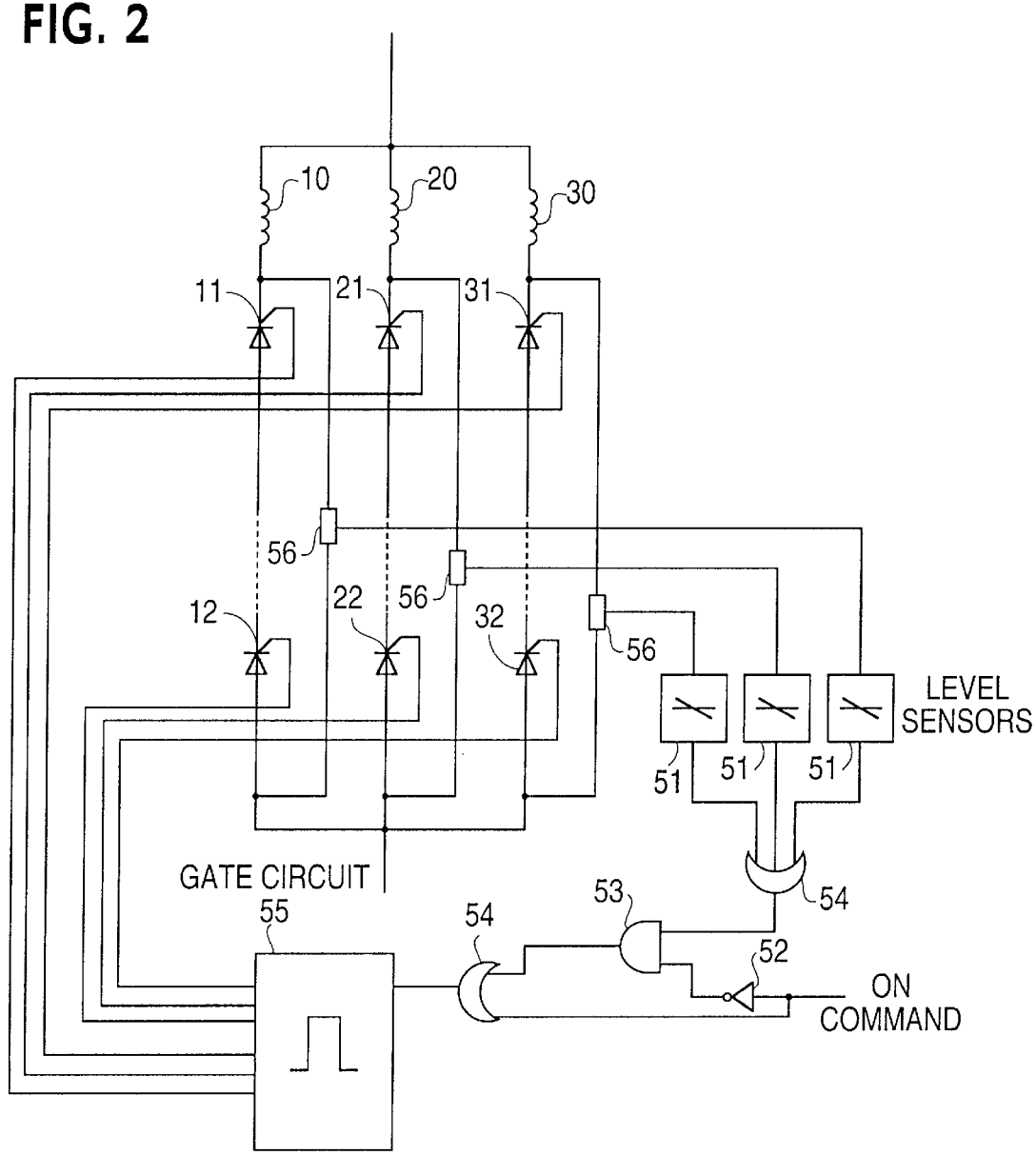
FIG. 2 is a schematic diagram showing a second embodiment of this invention.

FIG. 2 is a schematic diagram showing a second embodiment of this invention. In FIG. 2, 56 are voltage sensors which detect the voltage between the anodes and cathodes of VBO free thyristors 11 and 12, 21 and 22, 31 and 32. Also in FIG. 2, instead of detecting the firing of a VBO free thyristor using current as in FIG. 1, the over-voltage firing of a VBO free thyristor is detected by the fact that the voltage between the anode and the cathode of the VBO free thyristor caused by that voltage has become zero. Level sensors 51 in FIG. 2 detect that the voltages between the anodes and the cathodes have become almost zero. When a voltage has become almost zero in the state where there is no ON command, gate circuit 55 supplies firing pulses to all VBO free thyristors 11, 12, 21, 22, 31 and 32. In FIG. 2, voltage sensors 56 are connected one to each multiple series devices. However, even if voltage sensors 56 are connected to every individual VBO free thyristor, the effect of this invention will not be altered.

Also, in FIG. 1, current sensor 50 detects the entire current. However, even if the current is detected by connecting current sensors 50 to every individual parallel circuit, the effect of this invention will not be altered.

Although the invention has been described in its preferred form with a certain degree of particularity, it is understood that the present disclosure of the preferred form may be changed in the details of construction and other combinations and arrangements of parts may be resorted to without departing from the spirit and the scope of the invention as hereinafter claimed.

When this invention is used as described above, current concentration in one of the parallel switching circuits can be prevented and the switching elements can be prevented from breaking down.

What is claimed is:

1. A switching circuit protection apparatus comprising:

a switching circuit comprising multiple parallel circuits having at least one switching element each having a characteristic of self-firing if subjected to an over-voltage;

detect means for detecting the self-firing of any of the switching elements in the switching circuit due to the over-voltage; and fire means for applying a firing pulse to all the switching elements in response to an output signal from the detect means.

2. A switching circuit protection apparatus as claimed in claim 1, wherein each of the multiple circuits includes a plurality of switching elements connected in series.

3. A switching circuit protection apparatus as claimed in claim 1, wherein the switching element is a thyristor having a characteristic of self-firing in response to the over-voltage.

4. A switching circuit protection apparatus as claimed in claim 1, wherein the detect means is a current sensor.

5. A switching circuit protection apparatus as claimed in claim 1, wherein the detect means is a voltage sensor.

6. A switching circuit protection method comprising the steps of:

detecting the self-firing of at least one switching element due to an over-voltage in a switching circuit having multiple parallel circuits;

applying a firing pulse to all the switching elements in the switching circuit in response to the detected self-firing; and firing all un-fired switching elements at the same time due to the firing pulse.

7. An over-voltage protection circuit comprising:

a first current path having at least one switching element which self-fires when subjected to an over-voltage;

a second current path, connected parallel to said first current path, also having at least one switching element which self-fires when subjected to an over-voltage;

a detection circuit which detects a self-firing of either the switching element of said first current path or the switching element of said second current path; and a gate circuit which applies a firing pulse to turn on all un-fired switching elements to allow current to flow through both said first current path and said second current path to distribute current between said first current path and said second current path and thereby relieve said over-voltage when the detection circuit detects the self-firing of either the switching element of said first current path or the switching element of said second current path.

8. An over-voltage protection circuit as claimed in claim 7, wherein the detection circuit is a current sensor.

9. An over-voltage protection circuit as claimed in claim 7, wherein the detection circuit is a voltage sensor.

* * * * *